(12) United States Patent
Falk et al.

(10) Patent No.: US 11,805,110 B2
(45) Date of Patent: Oct. 31, 2023

(54) METHOD FOR TRANSMITTING DATA PACKETS

(71) Applicant: Siemens Aktiengesellschaft, Munich (DE)

(72) Inventors: Rainer Falk, Poing (DE); Kai Fischer, Baldham (DE); Steffen Fries, Baldham (DE); Andreas Furch, Freising (DE); Markus Heintel, Munich (DE); Niranjana Papagudi Subrahmanyam, Haar (DE); Tolga Sel, Munich (DE)

(73) Assignee: SIEMENS AKTIENGESELLSCHAFT

( * ) Notice: Subject to any disclaimer, the term of this patent is extended or adjusted under 35 U.S.C. 154(b) by 0 days.

(21) Appl. No.: 17/439,520

(22) PCT Filed: Mar. 6, 2020

(86) PCT No.: PCT/EP2020/056014
§ 371 (c)(1),
(2) Date: Jan. 25, 2022

(87) PCT Pub. No.: WO2020/187609
PCT Pub. Date: Sep. 24, 2020

(65) Prior Publication Data
US 2022/0150229 A1    May 12, 2022

(30) Foreign Application Priority Data
Mar. 19, 2019    (EP) .................................... 19163803

(51) Int. Cl.
*H04L 69/22*    (2022.01)
*H04L 9/40*    (2022.01)

(52) U.S. Cl.
CPC ......... *H04L 63/0485* (2013.01); *H04L 69/22* (2013.01)

(58) Field of Classification Search
USPC ........................................................ 713/160
See application file for complete search history.

(56) References Cited

U.S. PATENT DOCUMENTS 8,521,888 B2 *   8/2013   Larson .................... H04L 41/00
                                                   709/227
8,938,532 B2 *   1/2015   Terrell .................... H04L 69/22
                                                   709/224

(Continued)

FOREIGN PATENT DOCUMENTS

CN    103765842 A    4/2014
CN    103997501 A    8/2014

(Continued)

OTHER PUBLICATIONS

Jeba Annlin SV et al: "Reliable anonymous secure packet forwarding scheme for wireless sensor networks", Computers & Electrical Engineering, Pergamon Press, GB, vol. 48, pp. 405-416, XP029343051, ISSN: 0045-7906, DOI: 10.1016/J.COMPELECENG.2015.08.021; Abstract pp. 407-411; 2015.

(Continued)

*Primary Examiner* — Sakinah White Taylor
(74) *Attorney, Agent, or Firm* — Schmeiser, Olsen & Watts LLP

(57) ABSTRACT

Provided is a method for transmitting data packets over a network from a sender to a receiver via a communication link consisting of at least one transmission section, via which the data packet is transmitted from a sender node to a receiver node, the method having the following steps for at least one transmission section: first security information, which includes information about a cryptographic protective function used in the transmission of the data packet via an adjacent transmission section, is assigned to the data packet by the sender node, the data packet having the assigned security information is transmitted to the receiver node of (Continued)

the transmission section, the security information is checked in the receiver node against a preset guideline, and at least one measure is provided in accordance with the result of the check.

20 Claims, 3 Drawing Sheets

(56) References Cited

U.S. PATENT DOCUMENTS

| | | | | |
|---|---|---|---|---|
| 9,559,948 B2* | 1/2017 | Narayanan | ............... | H04L 49/25 |
| 2005/0010759 A1* | 1/2005 | Wakiyama | ............... | H04L 63/08 |
| | | | | 713/160 |
| 2008/0028210 A1* | 1/2008 | Asano | ................. | H04L 63/0485 |
| | | | | 713/161 |
| 2012/0060029 A1* | 3/2012 | Fluhrer | ............... | H04L 63/0428 |
| | | | | 713/160 |
| 2013/0239169 A1 | 9/2013 | Nakhjiri | | |
| 2014/0143855 A1 | 5/2014 | Keoh et al. | | |
| 2015/0188949 A1 | 7/2015 | Mahaffey et al. | | |
| 2019/0059128 A1* | 2/2019 | Gage | ................. | H04W 52/0206 |
| 2020/0154400 A1* | 5/2020 | Byun | .................... | H04W 74/08 |
| 2021/0044567 A1* | 2/2021 | Hu | ...................... | H04L 63/0236 |

FOREIGN PATENT DOCUMENTS

| | | | | |
|---|---|---|---|---|
| EP | 1500249 A1 | 1/2005 | | |
| WO | WO-2007113031 A1 * | 10/2007 | ......... | H04L 63/0485 |
| WO | WO-2017143611 A1 * | 8/2017 | ......... | H04L 12/4641 |

OTHER PUBLICATIONS

PCT International Search Report dated May 15, 2020 corresponding to PCT International Application No. PCT/EP2020/056014 filed Jun. 3, 2020.

* cited by examiner

METHOD FOR TRANSMITTING DATA PACKETS

CROSS-REFERENCE TO RELATED APPLICATIONS

This application claims priority to PCT Application No. PCT/EP2020/056014, having a filing date of Mar. 6, 2020, which claims priority to EP Application No. 19163803.0, having a filing date of Mar. 19, 2019, the entire contents both of which are hereby incorporated by reference.

FIELD OF TECHNOLOGY

The following relates to a method and a system, to a transmit node and a receive node for transmitting data packets via a network from a transmitter to a receiver using a communication connection comprising at least one transmission section which is used to transmit a data packet from a transmit node to the receive node.

BACKGROUND

Transmission of data, for example for control communication, monitoring, reconfiguration or for planning an industrial automation system, for example, must be protected against attacks. For this purpose, the transmission of data can be protected, for example, by security protocols such as the transport layer security protocol TLS, the IP security protocol IPsec or a media access control security protocol MACsec. These are security protocols which operate on a transport layer, on a network layer or on a data link layer corresponding to an OSI reference model standardized by the International Telecommunication Union (ITU). Different wired and/or wireless transmission technologies are used as the transmission medium, for example Ethernet, DSL, ATM, SDH, Bluetooth, ZigBee, WLAN, WiMAX and cellular mobile radio networks according to a UMTS, LTE or 5G standard of the 3GPP standardization organization.

A security solution may, in principle, be implemented independently of the transmission technology, for example on a session, presentation or application layer corresponding to the OSI reference model. However, this generally results in multiple encryption, that is to say encryption by the application and by the transmission system, for example.

US 2013/0239169 A1 describes a method which describes a policy for securely transmitting packets using a predefined transmission path and cryptographic signatures. In this case, an item of guideline information is appended to the data packet and the packet is cryptographically signed.

In the case of battery-operated devices and in the case of devices with their own energy generation in particular, this increases the energy requirement and impairs real-time properties in real-time applications. This concerns, in particular, future mobile radio networks which support Internet of Things devices. In addition, not all security aims can be tackled solely by security functions on the application layer, for example manipulation protection of mobile radio signaling messages.

SUMMARY

An aspect relates to cryptographically protect data transmission in an optimized manner and, in particular, to avoid multiple cryptographic protection of a data connection in the process.

According to a first aspect, embodiments of the invention relate to a method for transmitting data packets via a network from a transmitter to a receiver using a communication connection comprising at least two transmission sections which are used to transmit a data packet from a transmit node of the transmission section to a receive node of the transmission section, having the following steps for at least one transmission section. A first method step involves assigning an item of security information to the data packet by at least one transmit node, wherein the security information comprises the information relating to a cryptographic protective function used when transmitting the data packet via an adjacent transmission section. Further steps involve transmitting the data packet containing the assigned security information to a subsequent receive node, and checking the security information in the receive node with respect to a predefined guideline, and providing at least one measure depending on the checking result. The adjacent transmission section of a transmitter node may be that transmission section which was used to transmit the data packet to the transmit node (that is to say the transmit node forwards the data packet). The adjacent transmission section of a transmitter node may likewise be that transmission section which is used by the transmit node to transmit the data packet. The security information therefore indicates either how the data packet forwarded by the transmit node was protected or how the data packet is protected by the transmit node in the subsequent transmission section.

A protective function may comprise one or more functionalities used to cryptographically protect the transmission of data. The security information therefore provides an item of information which relates to the transmission of the data packet and is assigned to the data packet, in particular on a data link, network or transport layer. As a result of such an assignment of an item of security information to the data packet, the receive node can check the security information and can provide measures depending on the checking result.

If the adjacent transmission section was a radio interface for example, the protective function used on the radio interface is communicated to the subsequent receive node by the security information and can be evaluated and checked there.

Furthermore, depending on the checking result of the security information, an actuator as a receive node could accept or reject a data packet containing control information for monitoring, influencing or controlling a technical process. For example, the data packet comprising a control function, for example for monitoring, influencing or controlling a technical process, can thus be accepted in an automation installation via an actuator as a receive node.

Furthermore, a protective function for the data packet in the next transmission section is selected as a measure.

This makes it possible to select the protective function in the subsequent transmission section on the basis of the knowledge of the protective functions used in the preceding transmission section. If the adjacent transmission section was, for example, a radio interface with a high cryptographic protective function, a low protective function can be selected for the subsequent transmission section, for example. This is specified, for example, by the guideline. The protective function on a radio interface or in a VPN tunnel can therefore be used, for example, to achieve the required security of the entire communication connection.

In one embodiment, the data packet is assigned a further item of security information for the next transmission section and the further security information is transmitted, together with the at least one first item of security information, to the next receive node.

This has the advantage that a history of security information relating to the preceding transmission sections can be made available to the respectively next receive node for evaluation. The information relating to the manner in which the data packet was protected from eavesdropping or manipulation in different transmission sections can therefore be obtained from the data packet itself. This information is nowadays not available, with strength of the authentication method a receive unit and can be forwarded to a firewall, for example. Embodiments of the invention make it possible to evaluate the "transmission history" of a packet.

In one embodiment, the security information is assigned by arranging the security information in the header of the data packet.

This has the advantage that each individual data packet contains security information and is therefore directly available and can be evaluated in the receive node. A fast evaluation and response are therefore possible in the receive node.

In one embodiment, the assignment is carried out by arranging a reference value of the security information in the header of the data packet, and the security information is determined by the receive node in a security server on the basis of the reference value.

A reference value may be, for example, a hash value of the security information. The use of a reference value requires less transmission bandwidth in the subsequent transmission sections and reduces the overhead, that is to say the proportion of the header for payload data of the data packet, in particular in the case of a communication connection having a large number of transmission sections.

In one embodiment, the assignment is carried out by arranging an item of security information in a header of a superordinate data packet containing the data packet.

A superordinate data packet containing the data packet may be, for example, a data packet of a virtual private network connection (VPN). Receive nodes which terminate a VPN connection can therefore evaluate the security information and can handle it further according to guidelines in the VPN functionality.

In one embodiment, the cryptographic protective function comprises at least one of the details relating to a security option used, a security protocol used, in particular of the data link layer or the network layer or the transport layer corresponding to an OSI reference model, a cipher suite, a key length and/or a detail relating to the protected transmission path, for which the cryptographic protective function is valid.

The security information therefore specifies detailed information relating to different security aspects of the adjacent transmission section. A detail relating to the protected transmission path comprising one or more transmission sections, for example, can be used to provide, for example, an item of security information for a radio access connection, which extends, for example, from an access modem in an access network to a base station in the core network of a cellular mobile radio network, or specifies an item of security information relating to end-to-end protection of a transmission path.

In one embodiment, the security information is transmitted in a manner cryptographically protected and/or encrypted with respect to the authenticity of the transmit node and the integrity of the security information.

This prevents the security information from being read or manipulated by unauthorized third parties. For example, determination of transmission sections with little security or manipulation of the security information is therefore impeded or even prevented.

In one embodiment, the security information comprises an item of information relating to the authentication method used by the transmitter of the data packet when accessing the network.

Such an item of information may be, for example, a type of authentication used to authenticate the transmitter and the strength of the authentication method. This information makes it possible for a receive node or a subsequent transmit node to evaluate this information when selecting the protective function for the next transmission section and to enforce guidelines on the basis of the authentication method of the transmitter.

In one embodiment, the respective transmit node transmits the security information to a filter node or to the security server.

In the filter node or else in the security server, further filter criteria or security rules can be checked and, according to the checking result, can be transmitted to the receive node or to the subsequent transmit node.

In one embodiment, the transmitter additionally specifies a minimum security requirement for all security sections or for at least one transmission section and arranges the minimum security requirement in the data packet.

As a result, each individual transmit node or a subset of the transmit nodes can select the cryptographic protective function for the subsequent transmission section on the basis of the minimum security requirement.

A further aspect of embodiments of the invention relate to a system for transmitting data packets via a network from a transmitter to a receiver using a communication connection comprising at least two transmission sections which are used to transmit the data packet, comprising at least one transmit node and one receive node which are designed to carry out the method described above.

A further aspect of embodiments of the invention relate to a transmit node for transmitting data packets via a network from a transmitter to a receiver using a communication connection comprising at least two transmission sections which are used to transmit the data packet from the transmit node to a receive node, comprising an assignment unit which is designed to assign an item of security information, which comprises information relating to a cryptographic protective function used when transmitting the data packet via the adjacent transmission section, to the data packet, and a transmit unit which is designed to transmit the data packet containing the assigned security information to a subsequent receive node, wherein a protective function for the data packet in the next transmission section is selected as a measure.

The transmit node can therefore itself encode and transmit information relating to the cryptographic protective function, in particular on the transport, network and data link layer corresponding to the OSI reference model, in the data packet. This security information is therefore available to the receive node for further evaluation.

A further aspect of embodiments of the present invention relate to a receive node for transmitting data packets via a network from a transmitter to a receiver using a communication connection comprising at least two transmission sections which are used to transmit the data packet from a transmit node to a receive node, comprising a receive unit which is designed to receive the data packet, a checking unit which is designed to check the security information with respect to a predefined guideline, and a provision unit which is designed to provide at least one measure depending on the checking result, wherein a protective function for the data packet in the next transmission section is selected as a measure.

Such a receive node may evaluate the security information and may therefore check it with respect to predefined guidelines. In particular, the guidelines may avoid double protection of the data packets or may adapt the cryptographic protection for the next transmission section to the now known cryptographic protection of preceding transmission sections.

A further aspect of embodiments of the invention relate to a computer program product (non-transitory computer readable storage medium having instructions, which when executed by a processor, perform actions) which can be directly loaded into a memory of a digital computer, comprising program code parts which are suitable for carrying out the steps of the method described above.

Unless stated otherwise in the following description, the terms "assign", "transmit", "check", "provide" and the like relate to actions and/or processes and/or processing steps which change and/or generate data and/or convert the data into other data, wherein the data may be presented or may be present as physical variables, in particular, for example as electrical pulses.

In particular, the method can be implemented in a computer or carried out by processors. The expression "computer" should be interpreted as broadly as possible in order to cover, in particular, all electronic devices with data-processing properties. Computers are therefore, for example, personal computers, servers, handheld computer systems, pocket PCs, mobile radio devices and other communication devices which can process computer-aided data, processors and other electronic devices for data processing.

In connection with embodiments of the invention, a processor can be understood as meaning, for example, a device or an electronic circuit. A processor may be, in particular, a digital signal processor. A processor may also be understood as meaning a virtualized processor or a soft CPU. It may also be, for example, a programmable processor which is equipped with configuration steps for carrying out the method according to embodiments of the invention or is configured with configuration steps in such a manner that the programmable processor implements the features according to embodiments of the invention of the method, of the transmit and receive nodes, of the transmitter and the receiver or other aspects and partial aspects of embodiments of the invention.

The respective unit, for example the assignment unit, the transmit unit, the receive unit, the checking unit or the provision unit, can be implemented using hardware and/or software. In the case of a hardware implementation, the respective unit may be designed as an apparatus or as part of an apparatus, for example as a computer or a microprocessor or a control computer. In the case of a software implementation, the respective unit may be designed as a computer program product, as a function and a routine, as part of a program code or as an executable object.

A computer program product may be provided or delivered, for example, as a storage medium, for example a memory card, a USB stick, a CD-ROM, a DVD or else in the form of a downloadable file from a server in a network.

The embodiments and features described for the proposed method accordingly apply to the proposed system, the proposed transmit and receive nodes and other components involved in the method.

Unless stated otherwise or already stated, the following exemplary embodiments have at least one processor and/or a memory unit for implementing or carrying out the method.

BRIEF DESCRIPTION

Some of the embodiments will be described in detail, with references to the following Figures, wherein like designations denote like members, wherein.

DETAILED DESCRIPTION

Figure 1:
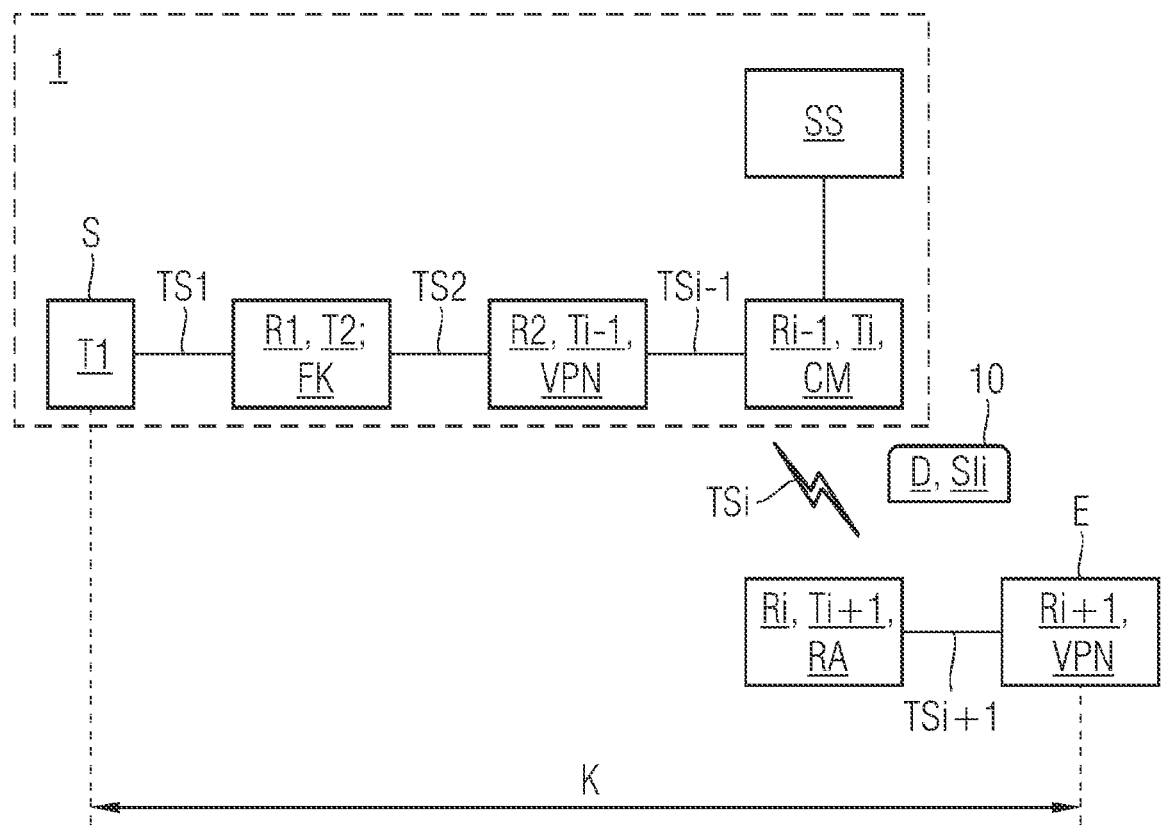
FIG. 1 shows a schematic illustration of an exemplary embodiment of a communication connection between a transmitter and a receiver comprising transmit and receive nodes according to embodiments of the invention.

FIG. 1 shows a schematic illustration of a communication connection K between a transmitter S and a receiver E. The transmitter S is, for example, a component of an automation network 1 or of another communication network in which data D are transmitted in data packets 10. The automation network 1 is connected to a service server as a receiver E via a VPN node VPN, which terminates a virtual private network, and a mobile radio modem CM having an access node RA of a mobile radio network, for example, and also via a public network, for example. A possible transmission path between the transmitter S and the receiver E, which provides a backend service for example, is illustrated by way of example.

The transmission path comprises a plurality of transmission sections TS1, TS2, TSi−1, TSi, TSi+1 which are each terminated by a transmit node T1, . . . , Ti+1 and a receive node R1, . . . , Ri+1. These are also referred to as end nodes of the transmission path. A transmitter S, a filter node FK, a VPN node VPN, a mobile radio modem CM or a network access node RA may be assigned to a transmit node T1, . . . , Ti+1 and to a receive node R1, . . . , Ri+1 and may be physically integrated, for example, or may be designed as an external component which is connected thereto via an external connection. An item of security information SIi relating to the type of transmission in the respective transmission section TSi may be respectively provided for each individual transmission section TS1, . . . TSi+1 or else for a transmission path comprising a sequence or a plurality of transmission sections.

In this case, the security information SIi comprises, in particular, a cryptographic protective function which was or is used in the respective adjacent transmission section TSi−1, TSi. This security information SIi comprises, in particular, information relating to the type of transmission, for example whether wireless, wired or a mixture of wireless and wired transmission is involved. For example, the specifically used transmission technology can be indicated, for example by the standard designation corresponding to the technology used, such as WLAN 802.11b Link or 3GPP 5G New Radio Link. These details may also relate to a protected transmission path, for which the cryptographic protective function is valid. A further detail relating to the protected transmission section TSi or transmission path is, for example, the identity of the end nodes of the transmission section TSi or of the transmission path, for example an IP address or a certificate of the end nodes of the transmission section TSi or of the transmission path. These also include details relating to the manipulation or eavesdropping protection, for example whether a physically protected transmission path or section TSi, a logical virtual private network or a cryptographically integrity-protected or cryptographically encrypted and integrity-protected transmission path or transmission section is involved.

The cryptographic protective function may also be a detail relating to at least one security option used. The detail may comprise the security option itself and its status, for example encryption active, integrity protection active, replay protection inactive. A security option is also the authentication and key agreement protocol used, the protocol version used or key update intervals or a revocation status of the cryptographic keys used, a length of an agreed session key or its effective length and the length of the authentication key used.

Furthermore, a security protocol used, in particular of the data link layer, of the network or transport layer corresponding to an OSI reference model, may be included as a cryptographic protective function. These are, in particular, security protocols such as MACsec, IPsec, IP over TLS or security protocols of the network layer for network access.

This cryptographic protective function is made available and assigned to a data packet 10 as security information SIi. The security information SIi is optionally respectively transmitted in a manner cryptographically protected and/or encrypted with respect to authenticity of the transmit node Ti and/or integrity of the security information. This is considered to be advantageous, in particular, for transmission sections TSi between network transition nodes, for example a mobile radio modem CM and a network access node RA of a mobile radio network.

Figure 2:
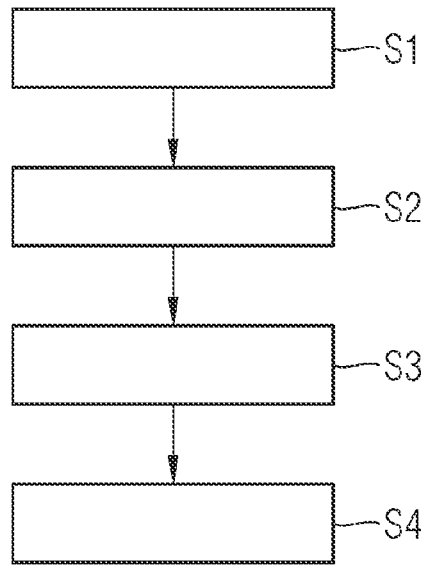
FIG. 2 shows an exemplary embodiment of a method according to embodiments of the invention in the form of a flowchart.

The method according to embodiments of the invention is now described on the basis of a flowchart in FIG. 2. A data packet 10 from the transmitter S to the receiver E is transmitted using a communication connection K having at least one transmission section TS1, . . . , TSi+1, wherein the transmission sections TS1, . . . , TSi+1 are arranged in different networks, for example an automation network 1 shown in FIG. 1, a mobile radio network with access nodes RA and possibly a further public IP network. In this case, a transmission section TSi is respectively terminated by a transmit node Ti and a receive node Ri. The index i here denotes any desired transmission section from the entirety of transmission sections TS1, . . . , TSi+1 used for the communication connection K.

For at least one of the transmission sections TS1, . . . , TSi+1, an item of security information SIi, which comprises information relating to a cryptographic protective function used when transmitting the data packet 10 via the subsequent transmission section TSi, is assigned to the data packet 10 by the transmit node TSi in a first method step, by way of example for the transmission section TSi. In this case, the data packet 10 is, in particular, an Ethernet frame or an IP packet. In the next method step S2, the data packet 10 containing the assigned security information SIi is transmitted to the receive node Ri of the transmission section TSi. In the receive node Ri, the security information SIi is evaluated in method step S3. For this purpose, the security information SIi is checked with respect to a predefined guideline.

Depending on the checking result, a measure is now provided in method step S4 by the receive node Ri based on the data packet 10.

In this case, a measure may be the fact that a protective function is selected for the data packet 10 in the next transmission section TSi+1. This selection can be implemented either by the predefined guideline in the receive node Ri or in a transmit node Ti+1 for the next transmission section. In particular, the further security information SIi+1 for the next transmission section TSi+1 is assigned to the data packet 10 and is transmitted, together with the at least one first item of security information (SIi), to the next receive node Ri+1. The security information SIi, SIi+1 may be explicitly encoded in the data packet 10 or may be referenced as a reference value, for example a hash value of the security information SIi, SIi+1. It may be encoded, in particular, in a header of the data packet, or the actual data packet may be packed in a further data packet in which the security information is encoded.

Figure 3A:
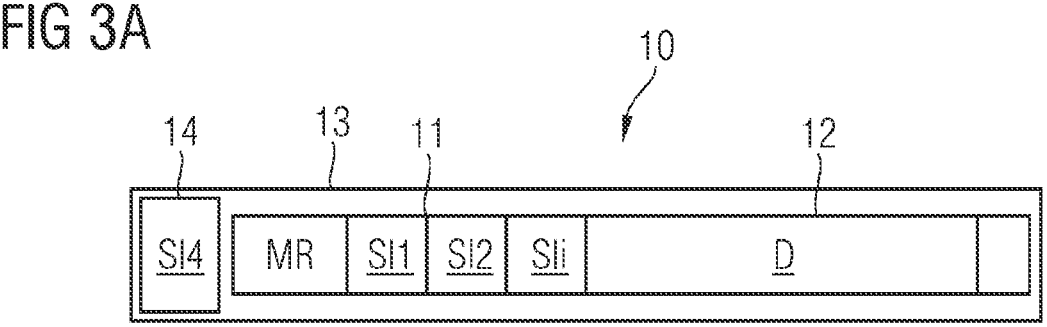
FIG. 3A shows a schematic illustration of a data packet according to embodiments of the invention.
Figure 3B:
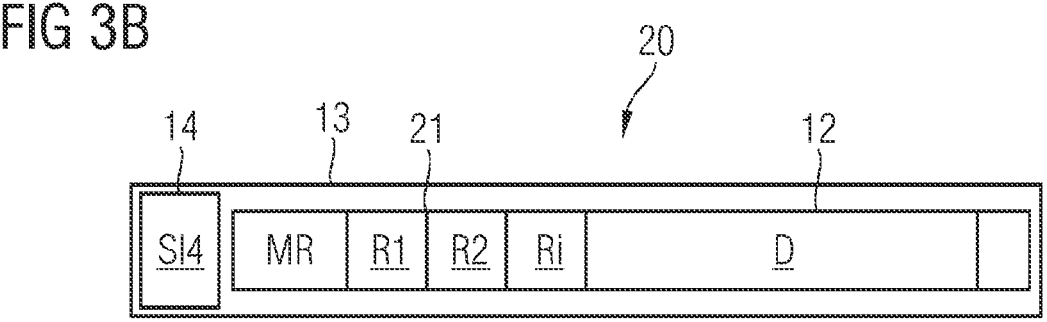
FIG. 3B shows a schematic illustration of a data packet according to embodiments of the invention.

FIGS. 3A and 3B show such a data packet 10, 20. The data packet 10, see FIG. 3A, comprises a payload data region 12, in which the payload data to be transmitted are arranged, and a header 11, which is usually placed in front of the payload data part 12. Three items of security information SI1, SI2 and SIi, for example, are included, that is to say encoded, in the header 11 and comprise cryptographic protective functions for the transmission sections TI1, TI2 and TIi.

In this case, security information for transmission sections which do not adjoin one another may also be assigned. The information relating to any desired transmission sections can therefore be encoded. An item of information indicating that a data packet 10 has been transmitted via a virtual private network tunnel, for example a site-to-site VPN, from T3 to Ri+1 in FIG. 1, and additionally via a cryptographically protected radio interface, see TSi in FIG. 1, may also be provided in the security information. This is arranged, in particular, in an item of security information SI4 in the header 14 of a superordinate data packet 13.

Instead of the security information itself, a reference value Ri may be arranged in the data packet 20 in the header 21 for the security information, see FIG. 3B. The security information relating to a transmission section may be stored in this case, for example, on a security server SS, see FIG. 1, and can be retrieved by the reference value Ri. This is useful, in particular, in the case of long-lasting communication connections or in the case of communication connections K in which relatively large volumes of data are collected.

The method indeed results in an overhead which appears to be relatively high. However, since many critical applications, for example in the industrial environment, for example an automation system, require an extremely high degree of reliability but have low data volumes in comparison with multimedia streaming data, for example, the method can nevertheless be expediently used. The overhead, that is to say the header of the data packet 10, can be reduced by storing the security information SI relating to the transmission section TSi externally, for example in a security server, and including only a unique reference value R for the entire communication connection K or a reference value Ri for each transmission section TSi in the data packet 10. Such a reference value may be, for example, a compressed network address of the security server SS. The security server SS illustrated in FIG. 1 may be used for this purpose, for example. In this case, the security server SS can be reached by each transmit node Ti and receive node Ri.

An item of information which makes a statement regarding the security method used by the transmitter of the message, for example a device or a user, to authenticate themselves at the access point thereof can also be encoded in the data packet 10, 20. Furthermore, a minimum requirement for protective functions for the communication connection K may be arranged in the header 11. This requirement can be concomitantly included when checking the security information, and measures for further measures for handling the data packet further can be derived on the basis of this minimum requirement.

The security information SI1, SI2, SIi relating to the individual transmission sections TS1, TS2, TSi and optionally a minimum requirement MR for the entire communication connection can be cryptographically protected. This may be achieved, for example, by a digital signature using known security algorithms such as RSA, a DSA or a digital signature algorithm with elliptic curves ECDSA. Alternatively, the security information is protected on the basis of a symmetrical key, for example by a protected message authentication code. This presupposes that a checking component, for example a receive node Ri or a filter node FK, knows the respective transmission section keys. The security information SIi may also be encrypted in order to make it difficult for a potential attacker to carry out a weak point analysis, in particular in the case of transmission sections with different levels of protection. In order to facilitate the key management for the security information, this information can also be transmitted from the end points, that is to say the transmit node Ti and receive node Ri, of a transmission section TSi to a filter node or to a central server. Such a central server may accordingly be queried by a filter node FK after authentication.

If the transmitter S of a data packet 10 has specified a required minimum requirement MR for the protection of the data packet 10 in certain types of data transmission in the data packet 10 in advance, it is possible to handle a data packet 10 independently of a local guideline on a transmit node Ti or a receive node Ri, for example to reject the data packet if the minimum requirement MR of the transmitter S is not complied with during transmission. In this case, a security event may be generated and communicated to the original transmitter S and/or the receiver E. The security event can then be distributed either in the actual transmission path or else using known mechanisms. However, these require additional logic and ports on the filter nodes for evaluating the security events.

Figure 4:
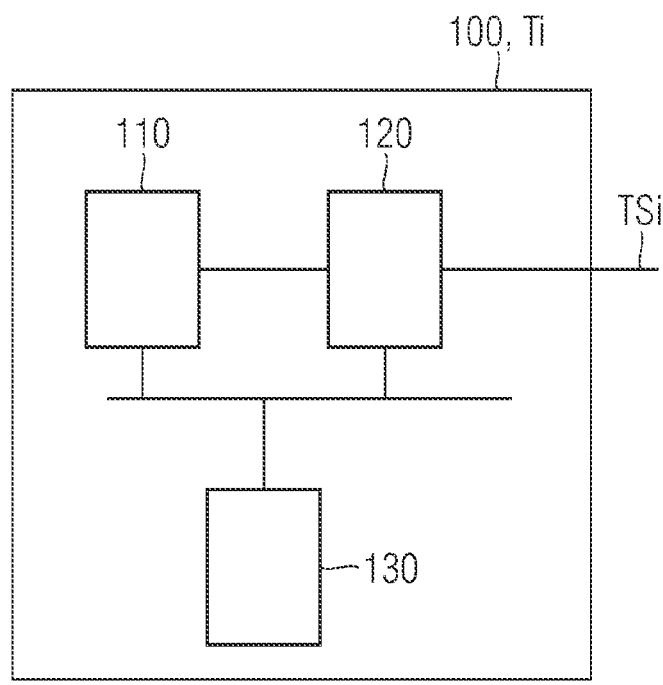
FIG. 4 shows a block diagram of a transmit node according to embodiments of the invention.

FIG. 4 illustrates a transmit node 100, Ti for transmitting the data packet 10, 20 via a network from a transmitter S to a receiver E using a communication connection K. The transmit node 100 comprises an assignment unit 110 which is designed to assign an item of security information SI, which comprises the cryptographic protective function used in the adjacent transmission section TSi−1, TSi, to the data packet 10. The transmit node 100 also comprises a transmit unit 120 which is designed to transmit the data packet 10, 20 containing the assigned security information SIi−1, SIi to the receive node, for example the receive node Ri.

The assignment unit 110 and the transmit unit 120 are connected to one another via a data bus, for example. The transmit node 100 may also comprise a filter node or a filter node functionality.

Figure 5:
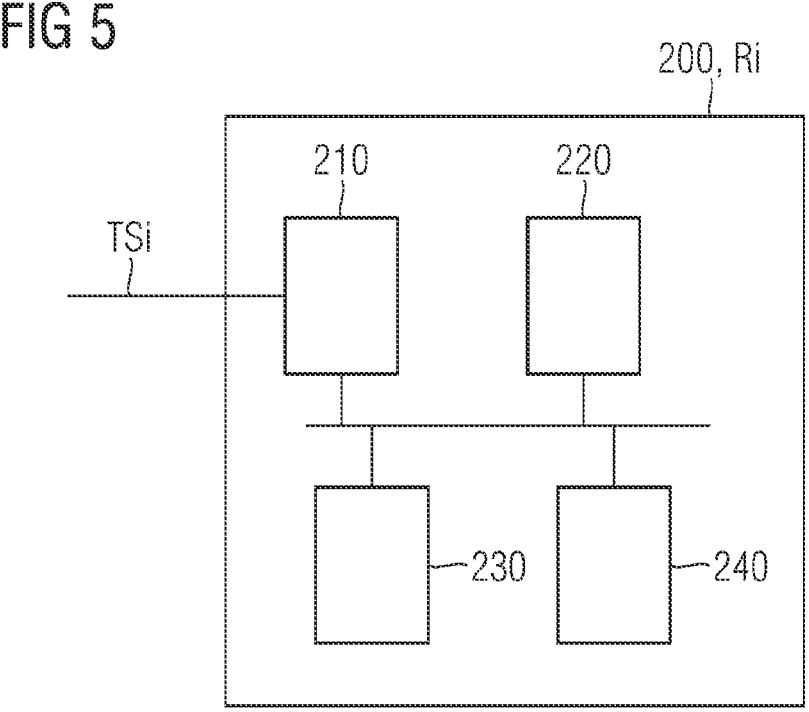
FIG. 5 shows a block diagram a receive node according to embodiments of the invention.

FIG. 5 accordingly shows a receive node 200, Ri. The receive node 200 comprises a receive unit 210 which is designed to receive a data packet 10, 20 via a transmission section TSi. The receive node 200 also comprises a checking unit 220 which is designed to check the security information SIi with respect to a predefined guideline. It also comprises a provision unit 240 which is designed to provide the next transmit node or a filter node or itself, for example, with at least one measure depending on the checking result.

The receive node 200 may additionally comprise a filter node FK or filter node functionality and may carry out filter node functions. The transmit node 100 and the receive node 200 additionally have a memory unit 130, 230 which comprises guidelines, with respect to which the received security information is checked.

The transmit and receive nodes 100, 200 also comprise a non-volatile memory unit (not illustrated), into which it is possible to load a computer program product containing program code parts which are suitable for designing the units mentioned such that they carry out the described method.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for transmitting data packets via a network from a transmitter to a receiver using a communication connection comprising at least a transmission section used to transmit a data packet from a transmit node of the transmission section to a receive node of the transmission section and at least a next transmission section used to transmit the data packet from a transmit node of the next transmission section to a receive node of the next transmission section, having the following steps:
   assigning an item of security information for the transmission section, which comprises information relating to a cryptographic protective function used when transmitting the data packet, to the data packet by the transmit node of the transmission section,
   transmitting the data packet containing the assigned security information to the receive node of the transmission section,
   checking the item of security information in the receive node of the transmission section with respect to a predefined guideline, and
   providing, by the transmit node of the next transmission section, at least one measure depending on the checking result, wherein the at least one measure includes a protective function for the data packet to be applied in the next transmission section, and
   wherein the protective function for the data packet to be applied in the next transmission section is different than the cryptographic protective function depending on the checking result.

2. The method as claimed in claim 1, wherein the data packet is assigned a further item of security information for the next transmission section and the further item of security information is transmitted, together with the item of security information, to a next receive node.

3. The method as claimed in claim 1, wherein the item of security information is assigned by arranging the item of security information in the header of the data packet.

4. The method as claimed in claim 1, wherein the assignment is carried out by arranging a reference value of the item of security information in the header of the data packet, and the item of security information is determined by the receive node in a security server on the basis of the reference value.

5. The method as claimed in claim 1, wherein the assignment is carried out by arranging the item of security information in a header of a superordinate data packet containing the data packet.

6. The method as claimed in claim 1, wherein the cryptographic protective function comprises at least one of the details relating to a security option used, a security protocol used, and/or a detail relating to the protected transmission path, for which the cryptographic protective function is valid.

7. The method as claimed in claim 1, wherein the item of security information is transmitted in a manner cryptographically protected and/or encrypted with respect to the authenticity of the transmit node and the integrity of the item of security information.

8. The method as claimed in claim 1, wherein the item of security information comprises an item of information relating to an authentication method used by the transmitter of the data packet when accessing the network.

9. The method as claimed in claim 1, wherein the respective transmit node transmits the item of security information to a filter node or to the security server.

10. The method as claimed in claim 1, wherein the transmitter additionally specifies a minimum security requirement for all transmission sections or for at least one transmission section and arranges the minimum security requirement in the data packet.

11. A system for transmitting data packets via a network from a transmitter to a receiver using a communication connection comprising at least two transmission sections which are used to transmit the data packet, comprising:
at least one transmit node and one receive node which are configured to carry out the method as claimed in claim 1.

12. A transmit node for transmitting data packets via a network from a transmitter to a receiver using a communication connection comprising at least a transmission section used to transmit a data packet from the transmit node to a receive node of the transmission section and at least a next transmission section used to transmit the data packet from a transmit node of the next transmission section to a receive node of the next transmission section, comprising:
an assignment unit which is configured to assign an item of security information for the transmission section, which comprises information relating to a cryptographic protective function used when transmitting the data packet, to the data packet, and
a transmit unit which is configured to transmit the data packet containing the assigned item of security information to the receive node of the transmission section, wherein a protective function for the data packet to be applied in the next transmission section is selected as a measure at the receive node, and wherein the protective function for the data packet to be applied in the next transmission section is different than the cryptographic protective function depending on a checking of the item of security information with respect to a predefined guideline.

13. A receive node for transmitting data packets via a network from a transmitter to a receiver using a communication connection comprising at least a transmission section used to transmit a data packet from a transmit node of the transmission section to the receive node and at least a next transmission section used to transmit the data packet from a transmit node of the next transmission section to a receive node of the next transmission section, comprising:
a receive unit which is configured to receive the data packet,
a checking unit which is configured to check the item of security information for the transmission section with respect to a predefined guideline, wherein the item of security information includes information relating to a cryptographic protective function used when transmitting the data packet to the receive node, and
a provision unit which is configured to provide at least one measure depending on the checking result, wherein a protective function for the data packet in the next transmission section is selected as a measure, and wherein the protective function for the data packet in the next transmission section is different than the cryptographic protective function depending on the checking result.

14. A computer program product, comprising a computer readable hardware storage device having computer readable program code stored therein, said program code executable by a processor of a computer system to implement the method as claimed in claim 1.

15. The method as claimed in claim 1, wherein the method is repeated for the next transmission section.

16. The method as claimed in claim 15, wherein the method is repeated for a further transmission section subsequent to the next transmission section.

17. The method as claimed in claim 1, wherein the communication connection further comprises at least a further transmission section used to transmit the data packet from a transmit node of the further transmission section to a receive node of the further transmission section, and wherein the method further comprises:
assigning a next item of security information for the next transmission section, which comprises information relating to a further cryptographic protective function used when transmitting the data packet, to the data packet by the transmit node of the next transmission section,
transmitting the data packet containing the assigned next item of security information to the receive node of the next transmission section,
checking the item of security information in the receive node of the next transmission section with respect to a predefined guideline, and
providing, by the transmit node of the further transmission section, at least one measure depending on the checking result, wherein a further protective function for the data packet to be applied in the further transmission section is selected as a measure.

18. The method as claimed in claim 1, wherein the method is repeated for additional transmission sections.

19. The method as claimed in claim 1, wherein the communication connection comprises a plurality of transmission sections and the method is repeated for each transmission section of the plurality of transmission sections.

20. The method as claimed in claim 2, wherein the further item of security information for the next transmission section is different than the item of security information.

* * * * *